Jan. 20, 1931. S. S. RIEGEL 1,789,690
LATERAL MOTION DEVICE
Filed Aug. 8, 1929 2 Sheets-Sheet 1

INVENTOR
Samuel S. Riegel
BY Synnestvedt & Lechner
ATTORNEYS

Jan. 20, 1931.  S. S. RIEGEL  1,789,690
LATERAL MOTION DEVICE
Filed Aug. 8, 1929  2 Sheets-Sheet 2

INVENTOR
Samuel S. Riegel
BY
Synnestvedt & Lechner
ATTORNEYS

Patented Jan. 20, 1931

1,789,690

UNITED STATES PATENT OFFICE

SAMUEL S. RIEGEL, OF SCRANTON, PENNSYLVANIA

LATERAL-MOTION DEVICE

Application filed August 8, 1929. Serial No. 384,351.

My invention relates to lateral motion devices for railway vehicle axle boxes and is especially adaptable to and advantageous for the driving boxes of a locomotive which has its frame cast as a one-piece structure in the manner adopted to some extent in the recent development of the art.

The objects of the invention include the provision of a device of this character which is of simple construction and which can be manufactured at a low cost.

It is also an object of this invention to provide a centering link mechanism for a device of the character described, the upper bearing of which can be bored by means of a boring bar so as to avoid the trouble and expense of more complicated machining steps heretofore necessary in connection with the bearing at this point. Furthermore, in connection with this object, I provide a means for securing the centering link to the structure which receives the load of the vehicle weight, such structure being adapted to receive the springs of the vehicle on its upper face and referred to hereinbelow as the spring saddle. I accomplish this object by utilizing the holes through which the boring bar was introduced for the insertion of suitable holding screws or pins which will keep the link in proper position, even when the axle boxes are dropped.

It is a further object of the invention to provide a readily accessible lubricating means for lubricating both the upper and the lower bearings of the link, as well as the point of contact between the frame of the vehicle and the spring saddle, as will further appear. In connection with this object, it is the aim of my invention to provide for this lubrication from a single source and to conduct the lubricant from a chamber in the saddle down through proper conduits or channels in the saddle itself and in the link so that all of the bearing surfaces referred to are properly lubricated.

A still further object of my invention includes the provision of means for readily adjusting the distance between the boxes of an axle so that wear may be taken up when necessary and so that they may be kept in proper alignment to the end that the lateral motion device will function to best advantage.

How the foregoing objects, together with such other objects as may appear hereinafter, or are incident to my invention, are obtained will appear in connection with the foregoing description of the accompanying drawings which illustrate the preferred embodiments of the invention, and in which—

Figure 1:
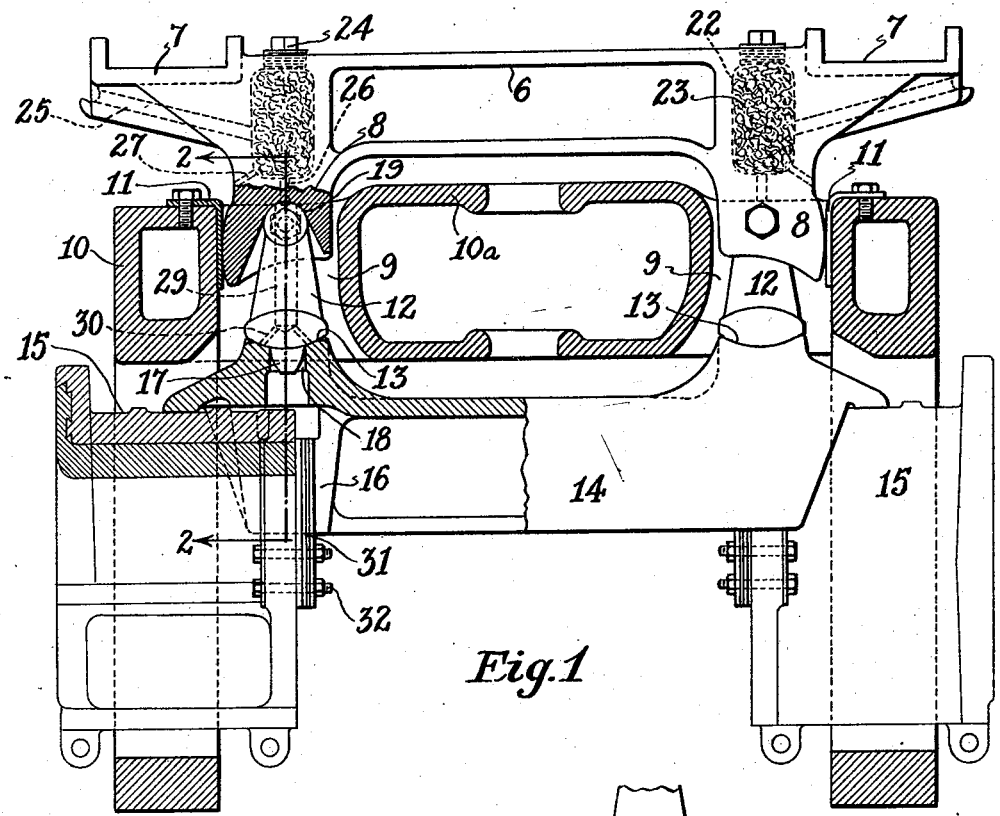
Fig. 1 is a vertical section through the center of the boxes of a vehicle axle illustrating the major features of my invention, the axle, however, being omitted for the sake of simplifying the drawing.

Referring to the drawings, it will be seen that the load of the vehicle is adapted to be transmitted to the spring saddle 6 which is provided on its upper surface with a spring pocket 7 at each end. On its under side the spring saddle is provided with a pair of downwardly projecting link pockets 8 which extend into suitable recesses or apertures 9 in the cross member 10a of the integral frame structure 10 of the vehicle.

Figure 2:
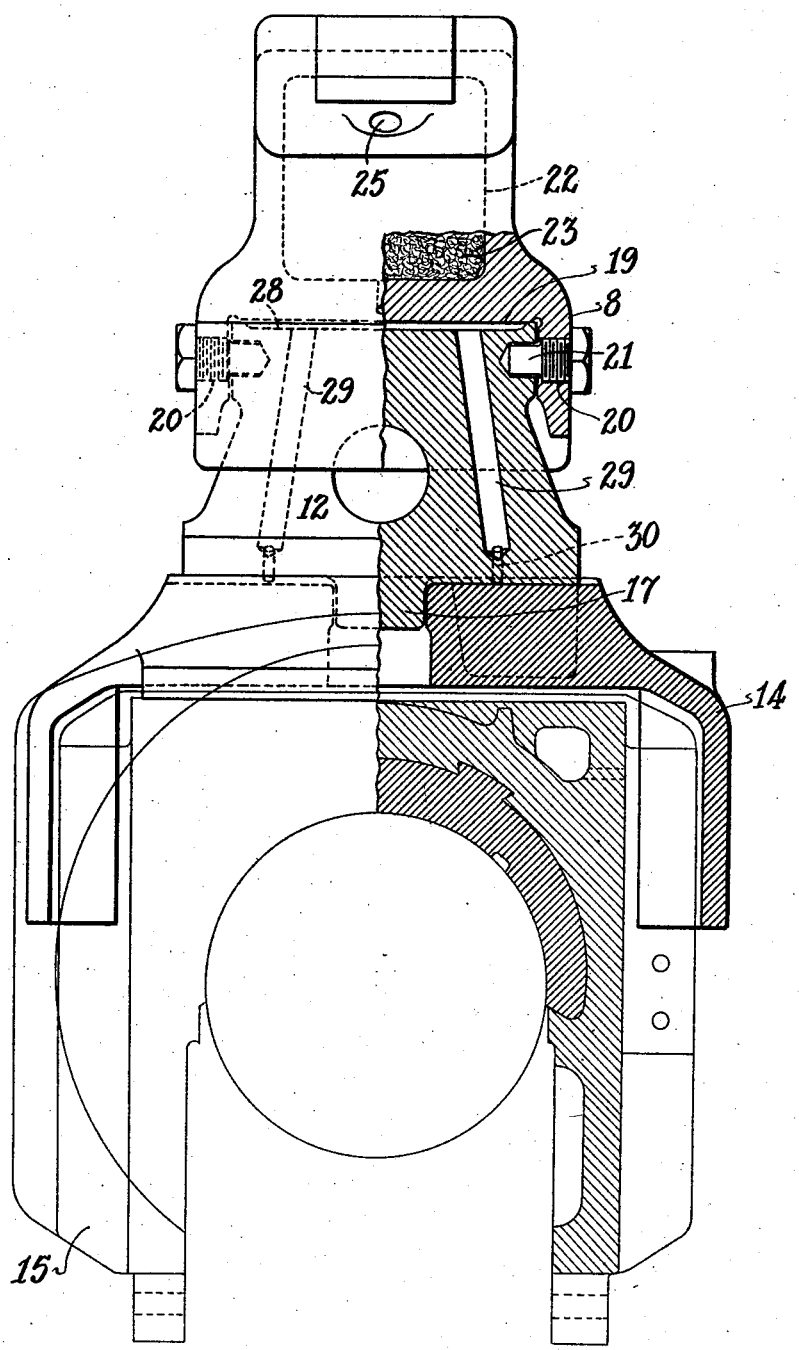
Fig. 2 is a section on the line 2—2 of Fig. 1, but on an enlarged scale.

In the embodiment of Figs. 1 and 2 the link pockets are adapted to bear at the outside against renewable wear plates 11 suitably secured to the frame structure 10.

The centering links 12, which will be described more in detail just below, have lower bearings 13 on the box centering housing 14, which housing, it will be seen upon inspection of the drawings, is adapted to bear both on the top of the boxes 15 and on the inner vertical faces thereof, the housing being provided at each end with a downwardly projecting abutment 16 through which contact with the inside vertical face of the box is provided.

The bearing of the centering link upon the box centering housing can be of any taper desired, and in the present instance I have shown it as approximately one inch in five inches. At the center of the bearing 13 I provide a downwardly extending projection 17 which is adapted to fit within a proper recess or opening 18 in the box centering housing 14.

The link itself is of exceedingly simple construction and is provided with a rounded top trunnion or bearing 19 which fits up on the inside of the link pocket 8 against a suitably formed surface in the base of the pocket 8, which is bored out by means of a boring bar inserted through holes 20 in the sides of the pocket 8, as most clearly illustrated in Fig. 2. After the boring bar is withdrawn, the holes 20 serve to receive the holding pins 21 which extend, as shown in Figure 2, a short distance into the upper portion of the centering link. The holes 20 and the pins 21 are, of course, concentric with the rounded bearing 19 so that the link 12 can move properly during operation of the device.

Above each link pocket 8 in the spring saddle 6 I provide a large lubricant reservoir 22 which can be filled with waste 23 and access to which can be had through an opening in the top of the saddle 6 adjacent the spring pocket 7, which opening is suitably closed by means of a plug 24. Oil can be introduced either through the opening at the top or through a laterally extending conduit 25 in the spring saddle which opens at the outside of the saddle just below the spring pocket 7 in a convenient location for application of an oiling can.

From the reservoir 22 suitable conduits 26 and 27 lead, respectively, to the bearing 19 and to the exterior of the pocket 8 just above the point of contact between the pocket and the wear plate 11. Lubricant can flow through these conduits to these bearing points, and in the top of the bearing or trunnion 19 I provide a longitudinal groove 28 which connects with two downwardly extending channels 29 at each side of the projection 17. Near the bottom of each channel 29 are smaller branches 30 which extend to the bearing surfaces 13.

By means of the construction just described it is possible to thoroughly lubricate all bearing points in my improved lateral motion device, the bottom bearing 13 being lubricated by means of suitable conduits which extend through the centering link itself. This, of course, greatly increases the life of the device.

In the showing of Figures 1 and 2, adjustment of the box is provided for by means of the shims 31 held in place by any suitable means, such as the bolts 32.

Figure 3:
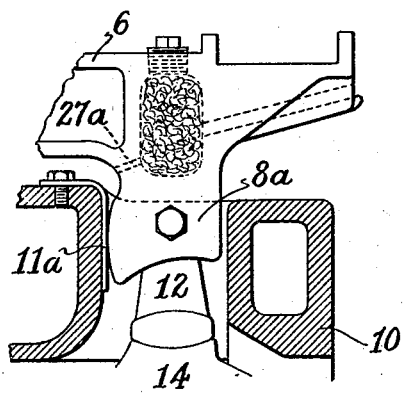
Fig. 3 is a fragmentary sectional view similar to that of Fig. 1 illustrating a slightly different arrangement of certain of the parts.

In the modification of Figure 3, the wear plate 11a is shown as being on the other side of the pocket 8a, inasmuch as it is possible to build the device with the point of contact between the spring saddle 6 and the frame structure 10 on the one side or the other. In this figure it will be necessary, of course, to locate the lubricating channel 27a on the opposite side of the pocket 8a.

Figure 4:
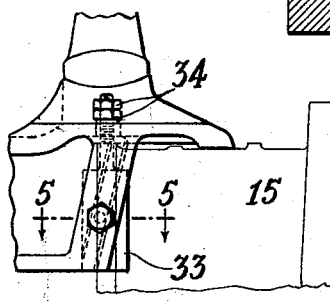
Fig. 4 is a fragmentary view illustrating a modified form of adjustment means for the boxes.
Figure 5:
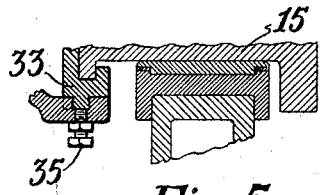
Fig. 5 is a section on the line 5—5 of Fig. 4.

A modified form of adjustment for the box is illustrated in Figures 4 and 5, from inspection of which it will be seen that I provide an upwardly and downwardly sliding wedge 33 so arranged that, when the wedge is raised by tightening up on the nuts 34, the box 15 will be moved outwardly, but, when the wedge is dropped, the box 15 can be moved inwardly. The set screw 35 is provided as a convenient means for holding the wedge 33 in position until the nuts 34 are properly locked.

I claim:—

1. A spring saddle for a lateral motion device having a pocket for receiving the head of a centering link characterized by the fact that the bearing for the link in said pocket is bored out with a boring bar through a hole in the side of the pocket.

2. In a lateral motion device, the combination of a spring saddle and a centering link characterized by the fact that the bearing for the link is in a pocket in the saddle and also that said bearing is bored out with a boring bar through a hole in the side of the pocket and that there is a pin extending through such hole for holding the link in place.

3. In a lateral motion device, the combination of a spring saddle, a box centering housing, and a centering link therebetween characterized by the fact that means are provided for supplying lubricant to the bearing surface between the saddle and the link and that lubricant passages are provided in the link for carrying lubricant to the bearing between the link and the housing.

4. In combination with a railway vehicle frame, an axle box lateral motion device having a spring saddle with a link receiving pocket which projects into an opening in the frame, said structure being characterized by the fact that the saddle is provided with a lubricant chamber and with passages therefrom which lead both to the inner and to the outer surfaces of the pocket whereby the points of bearing between the pocket and the frame and between the pocket and the link may be lubricated.

5. In combination with a railway vehicle frame, an axle box lateral motion device having a spring saddle with a link receiving pocket which projects into an opening in the frame, said structure being characterized by the fact that the saddle is provided with a lubricant chamber and with passages therefrom which lead both to the inner and to the outer surfaces of the pocket whereby the points of bearing between the pocket and the frame and between the pocket and the link may be lubricated, and further by the fact that a passage is provided through the link for supplying lubricant to the lower bearing of the link.

6. In a lateral motion device, the combination of a spring saddle and a centering link characterized by the fact that the bearing for the link is in a pocket in the saddle and also that said bearing is bored out with a boring bar through a hole in the side of the pocket and that there is a pin extending through such hole for holding the link in place, said pin and hole being concentric with the bored bearing.

7. In a lateral motion device, the combination of a spring saddle, a box centering housing, a centering link therebetween, a projection on the link extending into a recess in the housing, a bearing on each side of said projection, a lubricant reservoir in the saddle, a channel for carrying lubricant from said reservoir to the bearing between the link and the saddle, a lubricant groove in the upper bearing surface of the link, and a passage in the link on each side of said projection for supplying lubricant from said groove to the bottom bearings of the link.

8. In a lateral motion device, the combination of a spring saddle, a box centering housing, and a centering link therebetween having a bored circular bearing in the saddle.

9. In a lateral motion device, the combination of a spring saddle, a box centering housing, and a centering link therebetween having a bored circular bearing in the saddle, together with means extending through the boring holes for holding the link to the saddle.

10. In a lateral motion device, the combination of a spring saddle, and a centering link having a bored bearing in the saddle.

11. In a lateral motion device, the combination of a spring saddle, and a centering link having a bored bearing in the saddle, together with means extending through the boring holes for holding the link to the saddle.

12. In a lateral motion device for the boxes of a railway vehicle axle, the combination of a box centering housing and wedge means for adjusting the distance between the boxes.

13. In a lateral motion device, the combination of a railway vehicle frame having side members and a cross connecting member therebetween, an opening extending through said connecting member at each end thereof, weight transmitting means projecting downwardly into said openings, a box centering housing below said cross member, and centering links resting on said housing and projecting upwardly into said openings to meet the downwardly projecting weight transmitting means.

14. In an axle box lateral motion device, the combination of a vehicle frame having a cross connecting member, of an opening in said connecting member, weight transmitting means projecting downwardly into said opening and adapted to bear against the side thereof, a centering link projecting upwardly from the box to meet said weight transmitting means, and means for lubricating the point of bearing between the frame and said weight transmitting means.

15. In an axle box lateral motion device, the combination with a vehicle frame having a cross connecting member, of an opening in said connecting member, weight transmitting means projecting downwardly into said opening and adapted to bear against the side thereof, a centering link projecting upwardly from the box to meet said weight transmitting means, and lubricant passages in the weight transmitting means and in the link adapted to carry lubricant to the bearing surfaces.

16. A driving box lateral motion device for a locomotive having an integral frame comprising in combination, weight transmitting means projecting downwardly into an opening formed in the frame and a centering link projecting upwardly from the box to meet said weight transmitting means in said opening.

17. A driving box lateral motion device for a locomotive having an integral frame comprising in combination, weight transmitting means projecting downwardly into an opening formed in the frame and a centering link projecting upwardly from the box to meet said weight transmitting means in said opening, together with a renewable wear plate between the frame and the weight transmitting means.

In testimony whereof I have hereunto signed my name.

SAMUEL S. RIEGEL.